(12) United States Patent
Zafiroglu et al.

(10) Patent No.: US 7,875,334 B2
(45) Date of Patent: Jan. 25, 2011

(54) STITCHBONDED FABRIC WITH A SLIT SUBSTRATE

(75) Inventors: Dimitri P. Zafiroglu, Centreville, DE (US); Stephen H. Tsiarkezos, Elkton, MD (US)

(73) Assignee: Xymid L.L.C., Midlothian, VA (US)

( * ) Notice: Subject to any disclaimer, the term of this patent is extended or adjusted under 35 U.S.C. 154(b) by 739 days.

(21) Appl. No.: 11/839,348

(22) Filed: Aug. 15, 2007

(65) Prior Publication Data
US 2008/0166520 A1    Jul. 10, 2008

Related U.S. Application Data

(60) Provisional application No. 60/883,835, filed on Jan. 8, 2007.

(51) Int. Cl.
D05C 17/00    (2006.01)
B32B 5/12    (2006.01)
B32B 5/26    (2006.01)

(52) U.S. Cl. .................. 428/105; 428/114; 442/239; 442/268; 112/429; 112/431; 112/434

(58) Field of Classification Search .............. 428/105, 428/114; 442/239, 268; 112/429, 431, 434
See application file for complete search history.

(56) References Cited

U.S. PATENT DOCUMENTS

| | | | |
|---|---|---|---|
| 1,201,446 A * | 10/1916 | De Voe | ................ 112/434 |
| 3,025,196 A | 3/1962 | Burger | |
| 4,704,321 A | 11/1987 | Zafiroglu | |
| 4,773,238 A | 9/1988 | Zafiroglu | |
| 4,876,128 A | 10/1989 | Zafiroglu | |
| 4,891,957 A | 1/1990 | Strack et al. | |
| 4,998,421 A | 3/1991 | Zafiroglu | |
| 5,041,255 A | 8/1991 | Zafiroglu | |
| 5,187,952 A | 2/1993 | Zafiroglu | |
| 5,192,600 A | 3/1993 | Pontrelli et al. | |
| 5,203,186 A | 4/1993 | Zafiroglu | |
| 5,247,893 A | 9/1993 | Zafiroglu | |
| 5,288,536 A | 2/1994 | Zafiroglu | |
| 5,308,674 A | 5/1994 | Zafiroglu | |
| 5,486,385 A * | 1/1996 | Bylund et al. | ................ 428/17 |
| 5,634,997 A | 6/1997 | Anzilotti et al. | |
| 5,879,779 A | 3/1999 | Zafiroglu | |

(Continued)

OTHER PUBLICATIONS

Deneris, Kathleen, "Layer, Stitch, and Cut for a Terrific New Fabric With a Soft Lively Texture" Threads, Oct./Nov. 1996, pp. 31-33.

Primary Examiner—Jenna-Leigh Johnson
(74) Attorney, Agent, or Firm—Jeffrey C. Lew

(57) ABSTRACT

A stitchbonded fabric has a substrate material of uniform composition and physical properties and stitching threads stitched through and over the extent of the substrate in which the substrate has one or more slits defined by opposite facing lips that are unparted when the fabric is stitched. The fabric can be tensioned such that the lips part and thereby produce varied performance characteristics such as increased stretch and aesthetically pleasing effects as are useful in fabric utilities such as mattress cover skirts. The lips can pucker to give the fabric texture. The fabric can be extended and/or contracted laterally to further buckle out of plane. The puckering and buckling give the fabric additional functional properties such as dust-catching ability in cleaning wipe utilities.

56 Claims, 11 Drawing Sheets

U.S. PATENT DOCUMENTS

| | | |
|---|---|---|
| 6,124,001 A | 9/2000 | Sugita et al. |
| 6,263,814 B1 | 7/2001 | O'Conner |
| 6,280,815 B1 | 8/2001 | Ersfeld et al. |
| 6,407,018 B1 | 6/2002 | Zafiroglu |
| 6,423,393 B1 | 7/2002 | Wildeman |
| 6,811,870 B2 | 11/2004 | Zafiroglu |
| 6,821,601 B2 | 11/2004 | Tsiarkezos et al. |
| 6,919,117 B1 | 7/2005 | Kane et al. |
| 6,936,327 B2 | 8/2005 | Zafiroglu |
| 7,141,290 B2 | 11/2006 | Tsiarkezos et al. |
| 2003/0005599 A1 | 1/2003 | Panaccione |
| 2003/0220038 A1 | 11/2003 | Tsiarkezos |
| 2005/0196579 A1 | 9/2005 | Zafiroglu |
| 2008/0166516 A1* | 7/2008 | Zafiroglu .............. 428/102 |

* cited by examiner

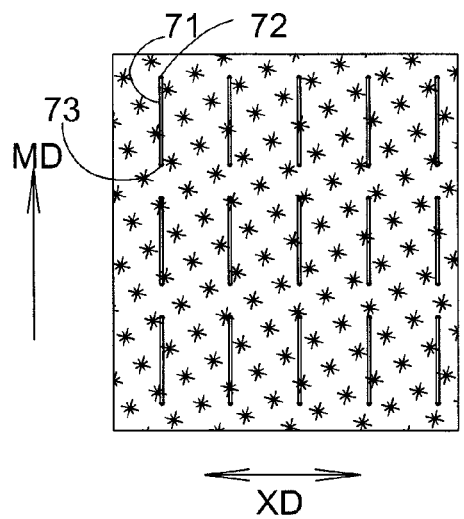
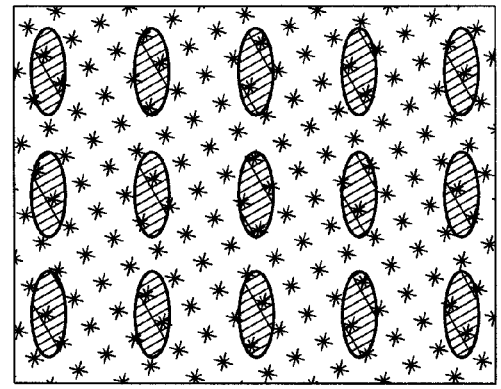
Fig. 7A Fig. 7B
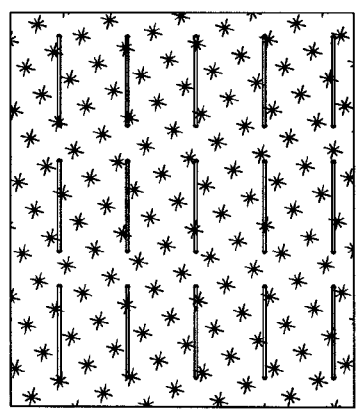
Fig. 7C

STITCHBONDED FABRIC WITH A SLIT SUBSTRATE

This application claims benefit of U.S. Provisional Application No. 60/883,835 filed Jan. 8, 2007.

FIELD OF THE INVENTION

This invention relates to a stitchbonded fabric having a substrate layer containing multiple slits. More specifically, the novel stitchbonded fabric is formed from a substrate layer of uniform composition which is perforated with multiple slits and stitched with a pattern of threads by a multi-needle stitching machine while the slits remain unparted. The resulting stitchbonded fabric has very enhanced tensile stretch characteristics and can be extended to provide varied and unique aesthetic and functional features.

BACKGROUND OF THE INVENTION

Stitchbonded fabrics and methods for producing them are known, as for example from K. W. Bahlo, "New Fabrics without Weaving" Papers of the American Association for Textile Technology, Inc. pp. 51-54 (November 1965). Such fabrics are made by multi-needle stitching of various fibrous substrates with elastic or non-elastic yarns, as disclosed, for example, by Zafiroglu in U.S. Pat. Nos. 4,704,321, 4,737,394 and 4,773,328.

Stitchbonded fabrics are versatile and have a wide variety of applications. Some fabric products, for example, covers for furniture, in particular mattress covers, call for the fabric to have good stretch and/or elastic stretch characteristics. Stitchbonded fabrics could be useful in such applications, however, many traditional stitchbonded fabrics have inadequate stretch capability. Customary stitchbonded fabrics also typically have a plain and monotonously uniform appearance that can detract from a product's aesthetic appeal.

To improve stitchbonded fabric stretch, the incorporation of stretchable yarns such as elastic and extensible partially oriented stitching yarns has been used. Despite stitching with stretchable yarns and, in some cases additionally gathering the stitched fabric in either machine direction ("MD") or cross direction ("XD"), the amount of stretch of the fabric has been limited. The limitations may result from the limited ability of the stitching yarns to stretch, constraint of the stitching pattern or, in respect to nonwoven substrates particularly, from the degrees of alignment and bonding of the substrate fibers. Stitching pattern limits stretch because the characteristic yarn angle of a stitchbonded fabric stitching pattern affects elongation. Yarn angle can depend upon the stitching thread counts per inch, the pattern notation, and spaces between adjacent stitches in the yarn notation. As concerns nonwoven substrate structures, parallel alignment of the fibers to high degrees (in the MD) tends to limit MD elongation and to promote fabric failure at low cross direction elongation when the nonwoven fibers are bonded to a relatively high degree. If the nonwoven fibers are aligned parallel to a lesser degree some additional XD stretch occurs but extension is limited by the interfiber bonding.

Selected advances in technology of stitchbonded fabrics are documented in many patents including those of D. Zafiroglu which are presently assigned to Xymid, L.L.C., such as U.S. Pat. No. 4,773,238; U.S. Pat. No. 4,876,128; U.S. Pat. No. 4,998,421; U.S. Pat. No. 5,041,255; U.S. Pat. No. 5,187,952; U.S. Pat. No. 5,247,893; U.S. Pat. No. 5,203,186; U.S. Pat. No. 5,308,674; U.S. Pat. No. 5,879,779; U.S. Pat. No. 6,407,018; U.S. Pat. No. 6,821,601; and U.S. Pat. No. 6,908,664.

A noteworthy utility for stitchbonded fabrics having desirable XD elongation and especially elastic XD elongation is that of skirts for mattress covers. A mattress cover skirt is a band of typically stretchable fabric attached to the periphery of and suspended downward from a top panel that covers the surface of the mattress. Usually the skirt is configured such that its MD is aligned with the periphery of the panel and XD corresponds to the normally narrower width of the skirt. The skirt's main function is to stretch effectively to hold the cover in place on the mattress. It is desirable to have mattress cover skirts with good cross direction as well as machine direction stretch properties.

The aesthetic feature of mattress covers is also becoming more important in the industry. Mattress cover skirts that hang down the sides of a bed are exposed to view and are increasingly being called upon by designers and consumers to match, complement and supplement the visual appeal of a bed linen ensemble. A need exists to improve and vary the decorative quality of mattress cover skirts to meet heightened visual design demands while maintaining and even adding to functional performance.

Many inventions pertaining to cover skirt technology are disclosed in various patents now assigned to Xymid, L.L.C., such as U.S. Pat. No. 5,636,393; U.S. Pat. No. 5,603,132; U.S. Pat. No. 6,199,231; U.S. Pat. No. 6,272,701; U.S. Pat. No. 6,842,921; and U.S. Pat. No. 6,883,193. The entire disclosures of all U.S. patent and patent applications identified herein are hereby incorporated by reference herein.

Certain additional utilities for fabrics include cushioning, insulation and filtration. These utilities frequently call for a degree of bulkiness and optional irregularity of surface structure that is typically lacking in conventional stitchbonded fabrics. It is desired to provide a stitchbonded fabric with increased bulk and with solid or interrupted surface substrate quality for these other fabric uses.

It is desirable to have a stitchbonded fabric that provides high stretch and optionally elastic stretch especially in the cross direction. A stitchbonded fabric having superior stretch and which is simple to manufacture with only minor modifications to conventional stitchbonding equipment is also much desired. There also is a need for making a stitchbonded fabric stretchable in an aesthetically pleasing manner and with overall strength and structural integrity. Additionally it is wanted to have stitchbonded fabrics that present highly decorative designs and varied appearance features without resorting to complicated and expensive stitching yarns and stitching patterns.

SUMMARY OF THE INVENTION

Accordingly, the present invention provides a novel stitchbonded fabric comprising a substrate layer of substrate material and stitching threads stitched through the substrate layer in a repeating pattern arranged in rows and columns over the extent of the substrate layer. The substrate material can be a fibrous fabric, a polymeric film, a metallic foil or combinations of them. Prior to stitching, the substrate layer is a largely planar, unitary matrix of undifferentiated composition and physical properties over its whole area and has a plurality of slits. Stitching is performed while the slits remain unparted. This can be accomplished by maintaining the substrate layer in a substantially relaxed state while stitching occurs. Existence of the slits imparts unusual tensile properties to the stitchbonded fabric. Also the completed stitchbonded fabric can be stretched such that the slits part and thereby produce uniquely varied performance characteristics and aesthetically pleasing visual effects.

Hence, this invention provides a stitchbonded fabric comprising (A) a substrate layer of a unitary substrate material having uniform physical properties, and the substrate layer defining a area, and (B) threads stitched through the substrate layer in a pattern of stitches coextensive with the area in which the substrate layer comprises a slit array of one or more unparted slits.

There is also provided a stitchbonded fabric made by a process comprising the following steps: (A) providing a substrate layer of a unitary substrate material having uniform physical properties and having a area, (B) introducing into the substrate layer a slit array of one or more unparted slits which have opposing lips, and (C) while maintaining the slits in an unparted state, continuously in a multi-needled, stitchbonding machine, stitching through the substrate layer with threads in a pattern of stitches coextensive with the area, thereby providing an unparted-slit stitchbonded fabric.

This invention further provides a process for making a stitchbonded fabric comprising the steps of (A) providing a substrate layer of a unitary substrate material having uniform physical properties and having a area, (B) introducing into the substrate layer a slit array of one or more unparted slits which have opposing lips, and (C) while maintaining the slits in an unparted state, continuously in a multi-needled, stitchbonding machine, stitching through the substrate layer with threads in a pattern of stitches coextensive with the area, thereby providing an unparted-slit stitchbonded fabric.

Yet additionally, this invention provides an article comprising the aforementioned fabric and which article is selected from the group consisting of a mattress cover skirt and a cleaning wipe.

BRIEF DESCRIPTION OF THE DRAWINGS

FIG. 7A is a schematic plan view of a swatch of an embodiment with interrupted straight slits of a stitchbonded fabric as-stitched according to this invention.

FIG. 7B is a schematic plan view of the swatch of fabric of FIG. 7A under XD tension.

FIG. 7C is a schematic plan view of the swatch of fabric of FIG. 7A under MD tension.

DETAILED DESCRIPTION OF THE INVENTION

Figure 1:
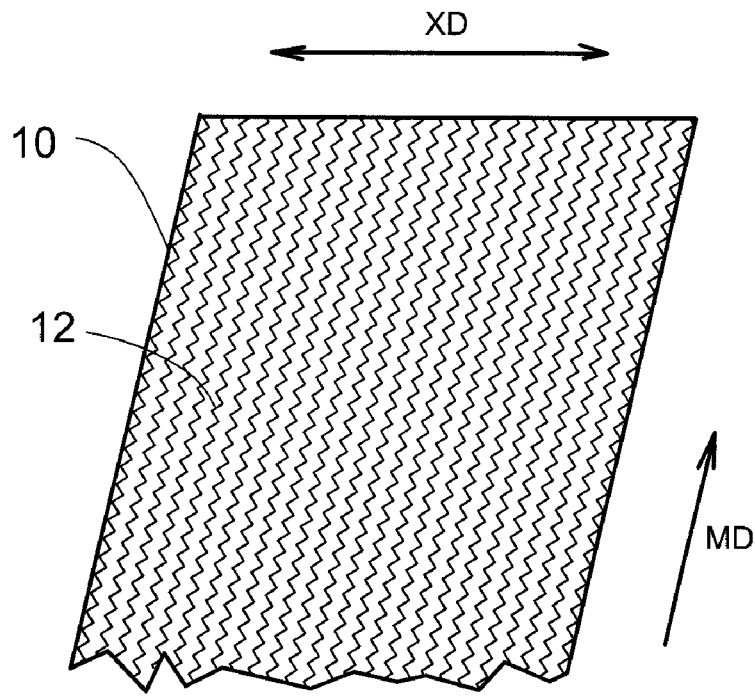
FIG. 1 is a perspective view of a portion of a unitary substrate material suitable for a substrate layer to be incorporated in an embodiment of the stitchbonded fabric according to this invention.

The term "stitchbonded" refers to the result of a multi-needle stitching operation performed on a substrate layer of a web of substrate material. According to this invention, the substrate material is a largely planar shaped, unitary material of undifferentiated composition and physical properties. That is, the substrate material is substantially a single piece construction, preferably of fibrous matter which has the same physical properties at all places over its whole area. The substrate layer is further formed by introducing a plurality of slits in the substrate material. The slits thus form a local discontinuity in the surface of the substrate layer. Importantly, the stitching yarns are stitched through the substrate layer while the slits are unparted, i.e., the opposite lips of the slits are substantially completely in close proximity to each other.

After stitchbonding is completed, the fabric can be stretched by application of external tensile forces. Such force applied at an angle to the tangent line of the slit causes the lips of the slit to part. The ability of the substrate to open at the slits gives the fabric unusual structure and improved elongation and dramatically different appearance from conventional stitchbonded fabrics as will be more fully explained, below. The novel stitchbonded fabric having a slit substrate is thus useful for stretch, aesthetic and other qualities as a component of diverse articles such as clothing fabric, cleaning wipe, filter element, cushioning layer, medical dressing or wrap, floor covering, wall covering, upholstery, and household fabrics including bed covers and mattress pads.

The term "yarn" which may occasionally be used interchangeably with term "thread" applied to stitching through substrate materials is understood to mean a single continuous strand of one or more plies of fiber filament. Substantially any strong yarn of types customarily used in the textile fabric stitchbonding field of art is suitable. Typically the fibers of these yarns are of textile decitex, meaning of size in the range of about 1 to about 22 dtex. Substrate material utilized in accord with this invention may be partially or wholly of fibrous structure and the fibers thereof can include staple fiber, i.e., finite length filament, and continuous filament fiber, usually of textile decitex.

The stitching thread can be stretchable or non-stretchable. The terms "stretch", "stretchable" and "stretching" herein refer to the incremental elongation to which a fiber, filament, yarn or fabric can extend under specified tension without incurring substantial structural damage. In present context, a fiber, filament, yarn or fabric is considered non-stretching if its incremental elongation is less than about 3% of the object's corresponding pre-tensioned dimension. The stitching thread, if stretchable, optionally also can be elastic.

The stitch density is not critical and is within the knowledge of one of ordinary skill in the art in view of the present disclosure. Typically, the number of rows of stitches across the width of the fabric (i.e., in the cross direction) that are inserted into the base layer by the multi-needle stitchbonding machine is in the range of about 1 to 10 per centimeter. Common conventional needle bars, for example, 6-gauge, 12-gauge, 14-gauge and 28-gauge are suitable. The number of stitches along the length of each row is usually also in the range of 1 to 10 stitches per cm.

Figure 2:
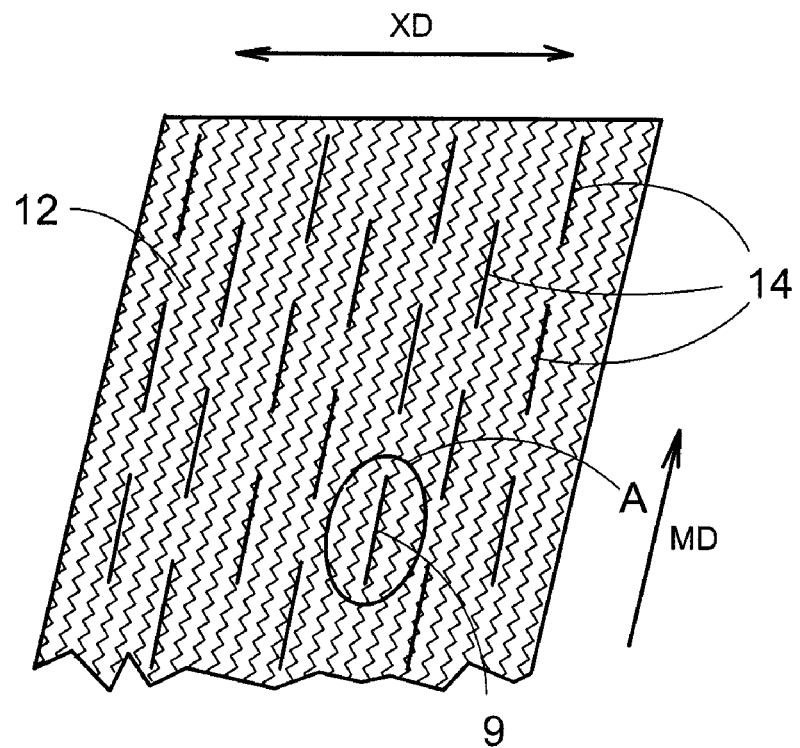
FIG. 2 is a perspective view of the portion of the substrate material of FIG. 1 which has slit called for by the substrate layer of this invention.
Figure 3:
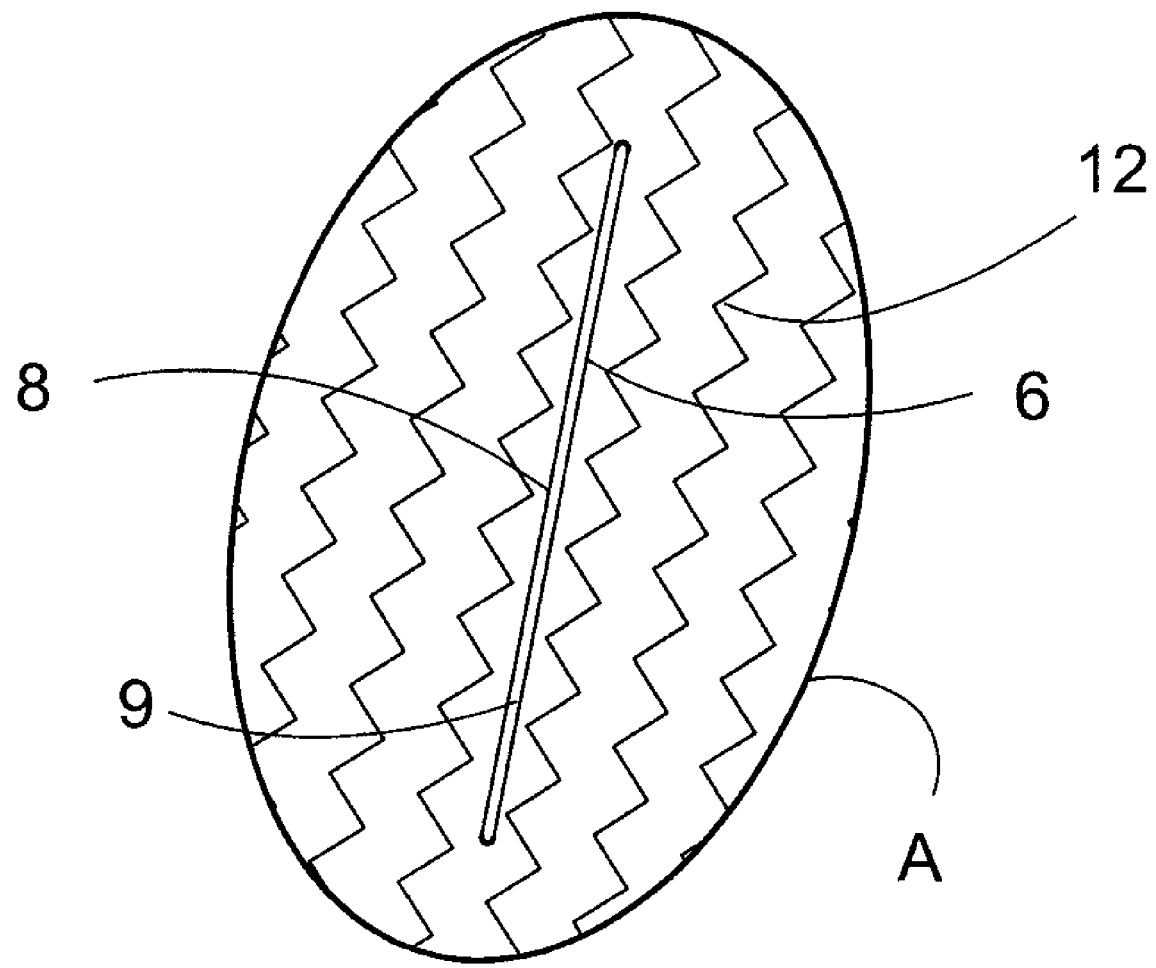
FIG. 3 is a magnified view of detail area A of FIG. 2 showing a slit with lips unparted.

The components and assembly of the novel slit substrate stitchbonded fabric can be initially understood with respect to FIGS. 1-5. In the drawings like parts have the same reference numbers. FIG. 1 shows a perspective schematic view of a portion 10 of a typical substrate material 12 in accord with this invention. The precursor substrate material 12 is a unitary material shown to be a single, uninterrupted piece. It is uniform over its whole area. FIG. 2 shows a perspective schematic view of the substrate material of FIG. 1 after a plurality of discrete straight slits 14 have been introduced. Slitting is performed by any of the well known methods for cutting a fabric, such as piercing the web with a knife blade. FIG. 3 is a magnified view of the detail area A of FIG. 2 surrounding one slit 9. After slitting, the substrate layer is stitchbonded. Importantly, stitchbonding takes place while the opposite lips 6 and 8 of the slit are in close proximity to each other. The term "unparted" is occasionally used to refer to this condition of the lips.

Figure 4:
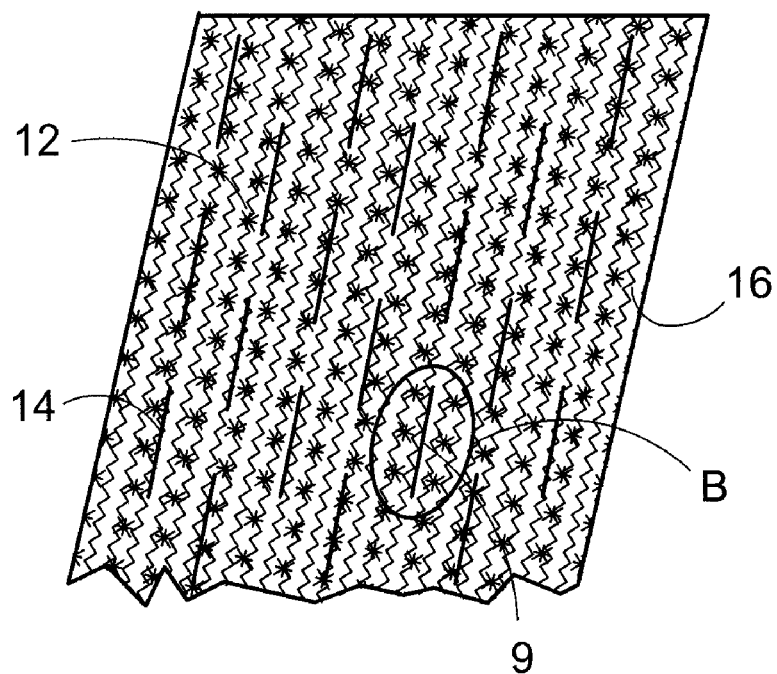
FIG. 4 is a perspective view of the portion of substrate material of FIG. 2 which has been stitchbonded in accord with the present invention.

FIG. 4 illustrates the piece of slit substrate material after a pre-selected pattern of stitches 16 is inserted through the substrate layer. The stitching pattern is coextensive with the substrate layer. Most of the stitches will penetrate the substrate material in view that the opposing lips of each slit are close to each other. Occasionally some stitching yarns will insert between the lips of the slits.

Once the stitchbonding is completed, the fabric can be stretched by application of tensile forces to produce unique and unusual effects. Stretching the stitchbonded fabric by forces applied in a direction at an angle to the tangent line of the unparted lips causes the lips to part. The larger the angle in the range from 0-90° relative to the tangent line, the wider apart the lips will spread.

Figure 5:
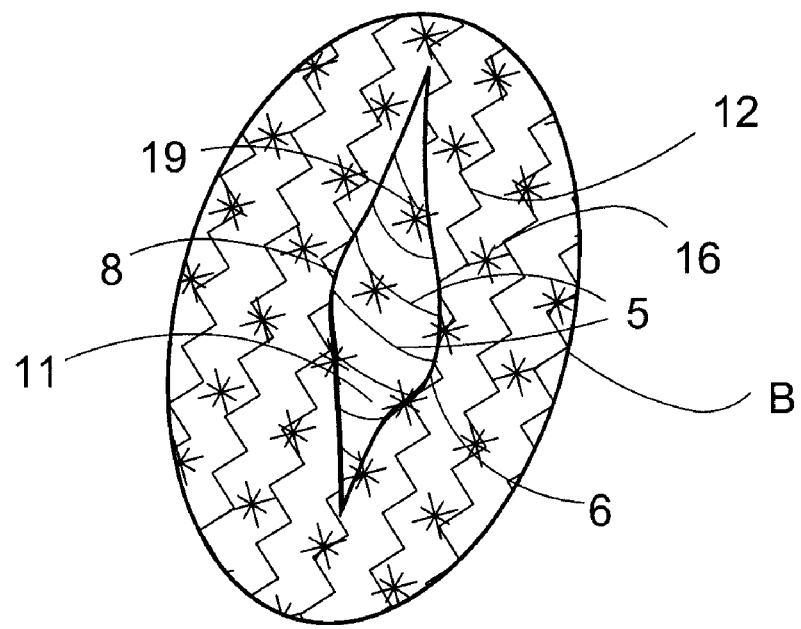
FIG. 5 is a magnified view of detail area B of FIG. 4 showing a slit stretched open by tensile stretching of the stitchbonded fabric according to this invention.

The consequence of such stretching is shown in FIG. 5 which is a magnified view of the area B surrounding slit 9 of FIG. 4 after stretching force is applied. The slits of FIGS. 1-4 are linear and they are oriented parallel to the machine direction ("MD", FIG. 1), thus the tangent lines to the slits are all aligned in the MD. FIG. 5 illustrates the parting of the lips when force is applied perpendicular to the tangent line, i.e., in the cross machine direction ("XD", FIG. 1). The cross machine direction, XD, and machine direction, MD, are shown by arrows in FIGS. 1 and 2. FIG. 5 shows that lips 6 and 8 of the slit have been pulled apart from each other. This opens a void area 11 within the slit. It can also be seen that most of the stitches 16 penetrate the substrate material outside the opened slit. Stitch 19 represents a stitch that penetrates at the slit. Stitching threads extend between the stitches. Parting of the lips exposes those stitching threads 5 within the area of the slits.

The extent to which the slit opens is limited by such factors additional to angle of tension as the stitched yarn pattern, stretching ability of stitching yarns, flexibility of the substrate material and length of the slit. These factors also impact upon the conformation of the slit stitchbonded fabric after the slits are pulled open. That is, the lips can remain substantially in the plane of the fabric or they can deform outward from the plane by puckering. Such puckering gives the fabric a distinctive three-dimensional texture and can have dramatic visual effect. This texture can also advantageously provide useful functionality for the fabric in cleaning wipe applications for example. When the fabric is drawn across a dirt or dust bearing surface, the puckered slits can probe and scour the surface and the dust can be entrapped within the void spaces between the stitched yarns within the slits and the puckered substrate.

A wide variety of embodiments of the instant invention are contemplated. For example, the slits in the substrate layer can be continuous or interrupted. The term "continuous" in describing the slit means that the slit extends fully across the substrate layer from one edge to another. The continuous slit is not constrained to extend only in the cross direction but can extend in any direction. To be continuous, a slit does not necessarily extend from one peripheral side of a fabric to the diametrically opposite side. The continuous slit should however run without break between points on the periphery of fabric piece.

Figure 6A:
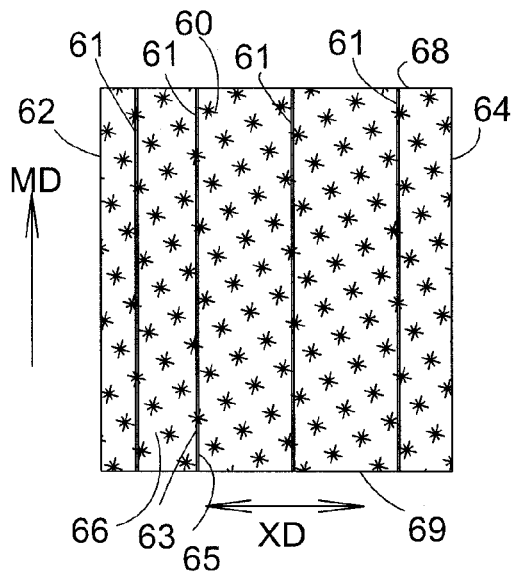
FIG. 6A is a schematic plan view of a swatch of an embodiment with continuous straight slits of a stitchbonded fabric as-stitched according to this invention.
Figure 6B:
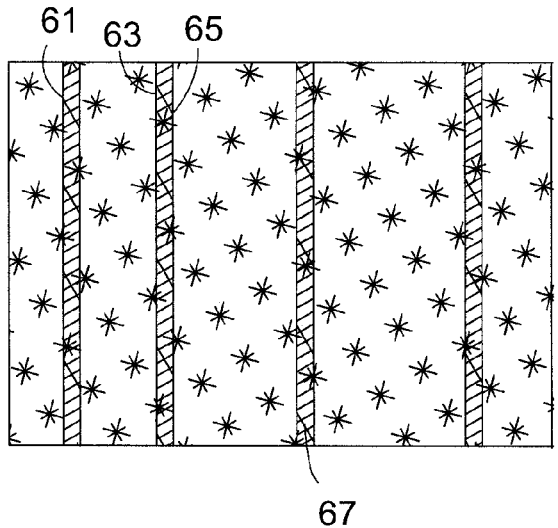
FIG. 6B is a schematic plan view of the swatch of fabric of FIG. 6A under XD tension.

Representative continuous slits are shown in FIG. 6A which is a rectangular swatch of the novel fabric in an "as-stitched" state, i.e., after stitchbonding free of tension and thus prior to any additional lateral deformation. The swatch is shown with its boundary side edges 62 and 64 aligned with the MD and top and bottom edges 68 and 69 aligned with the XD. For sake of illustration, the swatch contains four continuous linear slits 61 which extend fully across the swatch from top edge to bottom edge. The swatch is formed by a substrate layer 66 which is stitched over its whole area by stitching threads that penetrate through the substrate layer in a pattern of stitches 60. FIG. 6B illustrates the same swatch of stitchbonded fabric after it is stretched in the XD. The figures are not drawn to scale but do show that the swatch can stretch considerably in the XD. Much of the XD stretch is attributed to expansion of the fabric at the slits. XD tension of the fabric causes the lips 63 and 65 to spread apart from each other. This opening of the slits 61 exposes the stitching threads 67 within the slits.

Figure 6C:
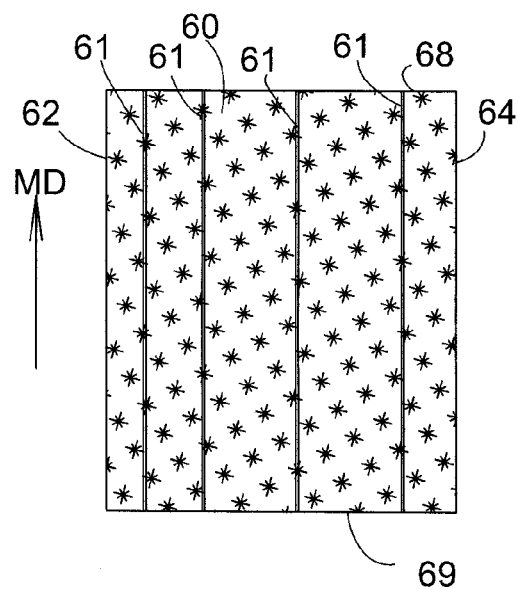
FIG. 6C is a schematic plan view of the swatch of fabric of FIG. 6A under MD tension.

FIG. 6C shows the swatch of stitchbonded fabric of FIG. 6A under tension in the MD. The tangent lines of all slits in FIG. 6A are parallel to the MD. Consequently, the angle between the force direction an the tangent line of the slits is zero and the slits do not spread open to any significant extent. Because of the limitations of the innate stretch characteristics of the substrate material, the swatch only stretches a slight extent in the MD (relative to FIG. 6A).

FIGS. 6A-6C illustrate straight linear continuous slits. By comparison, FIG. 7A depicts another embodiment of stitchbonded fabric that has an array comprising a plurality of straight linear interrupted slits 71. FIG. 7A shows the fabric in a relaxed condition as-stitched. The term "interrupted" regarding a slit means that the slit does not extend fully in any direction across the whole of the fabric from one boundary edge to another edge. Interrupted slits 71 have a beginning point and an ending point e.g., 72 and 73, respectively, within the area of the substrate layer. The term "interrupted slit" is also meant to encompass those slits which have one end within the bounds of the substrate and extend to another end at the periphery. FIG. 7B shows the fabric of FIG. 7A under XD tension and exhibiting significant XD stretch as a consequence of the opening of the slits. FIG. 7C shows the fabric of FIG. 7A under MD tension and exhibiting negligible, e.g., about 2%, MD and XD stretch.

The novel fabric according to this invention can have as few as a single slit. FIGS. 4 and 7A-7C are seen to show multiple slits arranged in a repeating array of equally spaced rows and columns. Non-repeating, irregular arrays of slits are also embraced by this invention. This is evident in FIGS. 6A-6C which show an unequal XD spacing between adjacent slits.

Figure 8A:
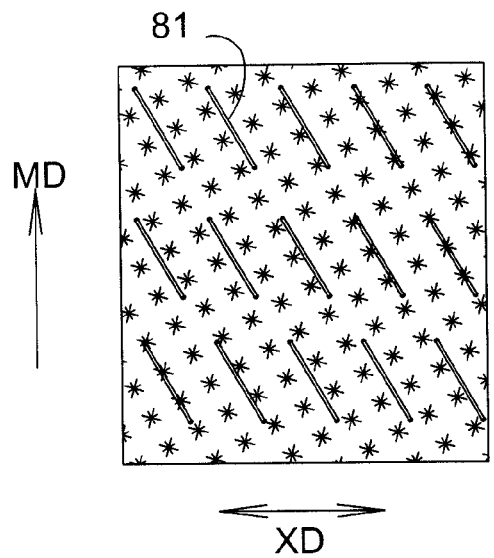
FIG. 8A is a schematic plan view of a swatch of an embodiment with interrupted straight slits oriented at an oblique angle to the machine direction of a stitchbonded fabric as-stitched according to this invention.
Figure 8B:
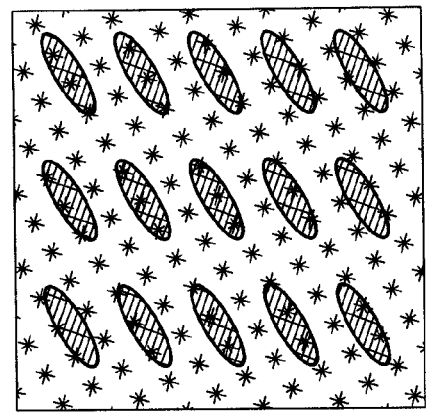
FIG. 8B is a schematic plan view of the swatch of fabric of FIG. 8A under XD tension.
Figure 8C:
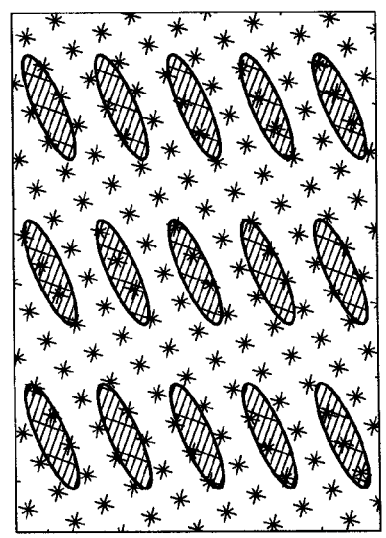
FIG. 8C is a schematic plan view of the swatch of fabric of FIG. 8A under MD tension.

FIGS. 4, 6A-6C and 7A-7C, also show embodiments in which the straight slits are all aligned parallel to the MD. According to this invention the slit lines can be other than parallel to each other or to the MD. The slits can be parallel to the XD, for example. In that situation the resulting stitchbonded fabric will have expanded stretch in the MD and negligible stretch in the XD. The slits can be oriented at an oblique angle to the MD, i.e., non-orthogonal to the MD and XD. Such an embodiment is illustrated in FIGS. 8A-8C, FIG. 8A shows a swatch of relaxed as stitched stitchbonded fabric in which the slits in the substrate layer 81 are oriented at such an oblique angle. FIG. 8B shows the same swatch under tension in the XD. The slits open to a moderate degree because the direction of tension is less than perpendicular to the tangent line of the slits. Thus overall extension in the XD is somewhat increased and extension in the MD is still not much effected by the XD tension. FIG. 8C shows the same swatch as in FIG. 8A under tension in the MD. Unlike the slits in FIG. 7C, here the slits open to a moderate degree because the direction of tension is at a finite angle to the tangent line of the slits. Also the fabric exhibits a commensurately increased degree of overall stretch in the MD.

It is contemplated that the stitchbonded fabric can be tensioned in multiple directions simultaneously such that effects, e.g., opening of the slits and lateral extension of the fabric described above, will be compounded. The fabric can be tensioned in both the XD and the MD, or in multiple obliquely angled directions. The tension force in each direction can be the same or different from the force exerted in other directions.

Figure 9A:
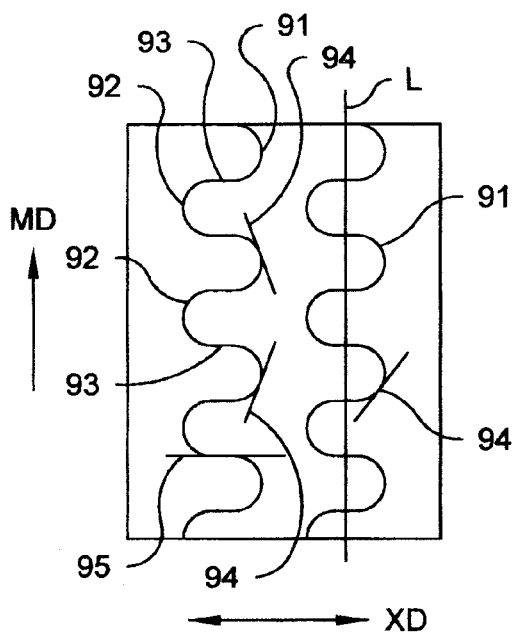
FIG. 9A is a schematic plan view of a swatch of continuous curvilinear slit stitchbonded fabric as-stitched according to an embodiment of this invention.
Figure 9B:
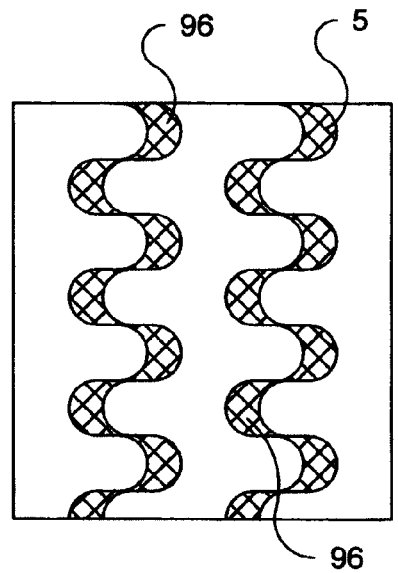
FIG. 9B is a schematic plan view of the swatch of fabric of FIG. 9A under XD tension.
Figure 9C:
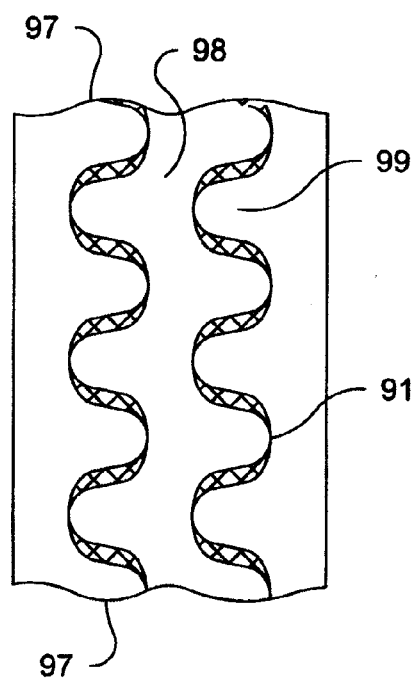
FIG. 9C is a schematic plan view of the swatch of fabric of FIG. 9A under MD tension.

In still another embodiment the slits are curvilinear, that is, the adjacent opposing edges of the slit lips have curvature. An example of a continuous curvilinear slit stitchbonded fabric according to the present invention is shown in FIGS. 9A-9C. The stitching points are not shown in these figures. FIG. 9A shows a swatch of the novel stitchbonded fabric as-stitched with two continuous curvilinear slits 91. Each slit includes segments having curvature 92 and straight linear segments 93. The straight linear segments 93 are aligned parallel to the XD. FIG. 9B illustrates the result of applying XD tension to the swatch of FIG. 9A. Lips of the slits of segments which define tangent lines 94 at an angle to the XD separate to form open areas 96 and the stitching threads 5 within the open areas become exposed. The amount of separation depends largely upon the angle that the tangent line makes relative to the XD (tension force direction in the depicted embodiment) while also being limited by the factors mentioned above. Separation of the lips is greatest where the tangent line is perpendicular to the direction of force. The stitchbonded fabric overall also extends laterally in the XD. FIG. 9C shows the swatch of FIG. 9A after application of tension in the MD. Here the lips of the mainly straight linear slit segments which define tangent lines 95 that are perpendicular to the MD separate substantially and the curved segments 92 open to a varied degree depending on the angle of the tangent line at any point along the slit. Overall extension of the MD-stretched swatch is also varied. The areas 99 of the swatch through which the curvilinear slits 91 pass are able to extend farther than the areas 98 which are between of slits. These areas are limited by the stretch characteristics of the stitched substrate material. Variations in MD stretch are further evident by the curvature of the upper and lower edges 97 of the swatch (FIG. 9C).

Many additional different embodiments of the novel stitchbonded fabric with a curvilinear slit substrate are contemplated. By way of example it is seen from FIG. 9A that the continuous curvilinear slits 91 each define an axis L. In the embodiment of FIG. 9A, the axes of curvilinear slits are mutually parallel. In other contemplated embodiments the axes of one or more curvilinear slits are not parallel. Spacing between the axes of adjacent curvilinear slits can be made smaller or larger such that the size of the area 98 (FIG. 9C) increases or decreases. In an extreme where area 98 reduces to zero, the axes L can be close together such that the curved segments 92 of one slit nest within the curved segments of an adjacent slit.

Figure 10:
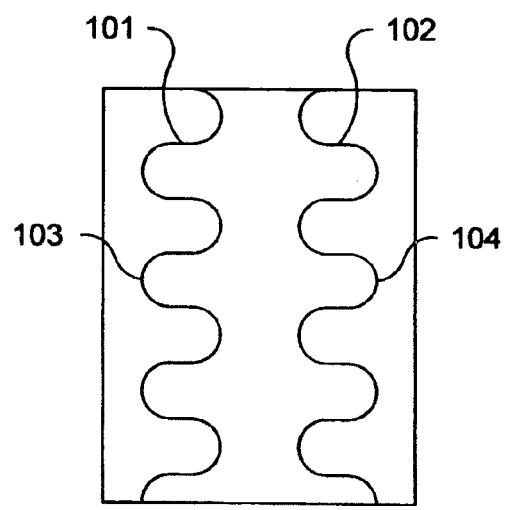
FIG. 10 is a schematic plan view of a swatch of the novel fabric as stitched having two continuous curvilinear slits which are out of phase.

Another embodiment of a substrate with continuous curvilinear slits is shown in FIG. 10. The substrate has two slits 101, 102. The curved segments 103 of slit 101 are out of phase with the curved segments 104 of slit 102. This is different from the configuration of FIG. 9A in which the curvature of the curved segments are mutually in phase. It is further contemplated that the degree to which the curvature of adjacent continuous curvilinear slits are out of phase can vary between the extremes represented by FIGS. 9A and 10. Still other preferred embodiments include those in which in a stitchbonded fabric (i) the continuous curvilinear slits are positioned parallel to the XD, (ii) the continuous curvilinear slits are mutually parallel at an oblique angle relative to the MD and the XD (iii) the continuous curvilinear slits are not mutually parallel, and (iv) the curvature of each continuous curvilinear slit is a different size and/or shape from other continuous curvilinear slits.

Figure 11A:
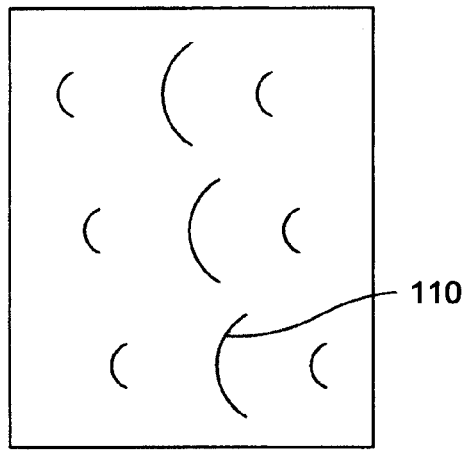
FIG. 11A is a schematic plan view of a swatch of fabric having a plurality of interrupted crescent shaped curvilinear slits as stitched according to an embodiment of this invention.
Figure 12A:
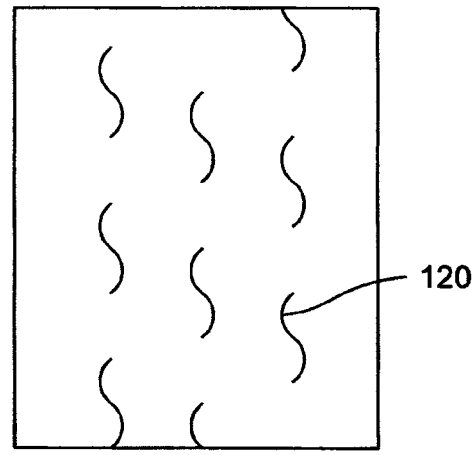
FIG. 12A is a schematic plan view of a swatch of fabric having a plurality of interrupted S shaped curvilinear slits as stitched according to an embodiment of this invention.
Figure 11B:
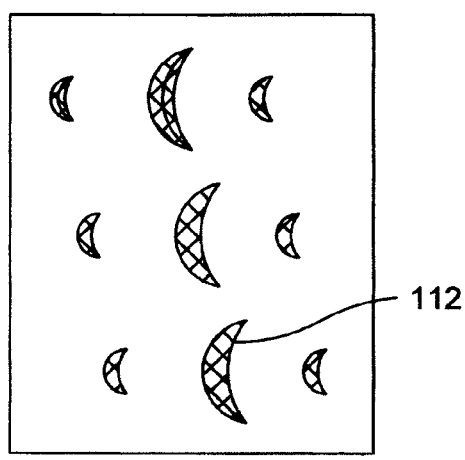
FIG. 11B is a schematic plan view of the swatch of FIG. 11A under tension in the XD.
Figure 12B:
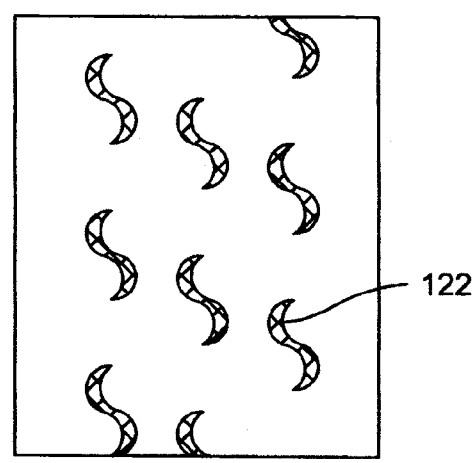
FIG. 12B is a schematic plan view of the swatch of FIG. 12A under tension in the XD.

In other preferred embodiments, the substrate layer defines a plurality of interrupted curvilinear slits. Representative examples of fabrics with an array of crescent shaped slits 110 and of "S" shaped slits 120 are shown in FIGS. 11A and 12A, respectively. Stitching points are not shown. FIGS. 11B and 12B show the varied effects brought about by opening slits 112 and 122, respectively, that are achieved by elongating the swatches of FIGS. 11A and 11B in the XD direction. The relative spacing, angle of rotation relative to XD and MD, size of the slits, orderliness of the slits and spacing between slits all can be changed individually or in combination from the embodiments shown. Appearance and stretch characteristics of the stitchbonded fabrics according to the embodiments of FIGS. 11A and 12A when stretched in the MD direction will also be different. Thus this invention advantageously provides the designer with great freedom to produce stitchbonded fabrics with diverse appearance and stretch characteristics.

Figure 13A:
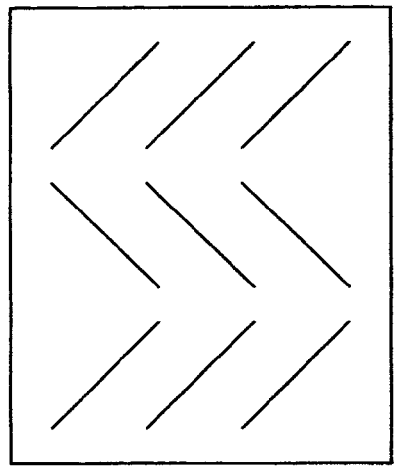
FIG. 13A is a schematic plan view of a swatch of fabric having a plurality of interrupted straight slits in a herring bone array as stitched according to an embodiment of this invention.
Figure 13B:
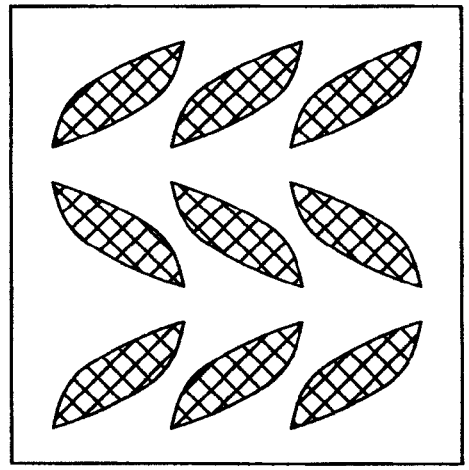
FIG. 13B is a schematic plan view of the swatch of FIG. 13A under tension in the XD.
Figure 13C:
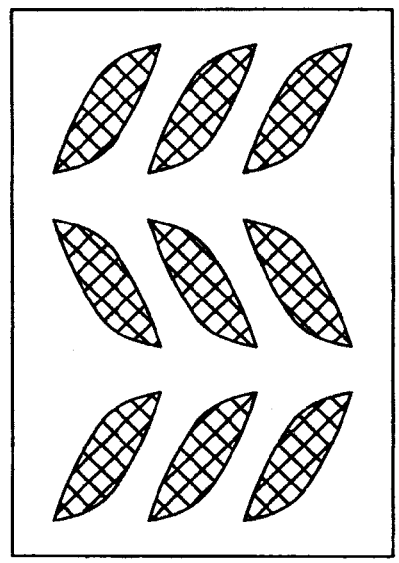
FIG. 13C is a schematic plan view of the swatch of FIG. 13A under tension in the MD.
Figure 14:
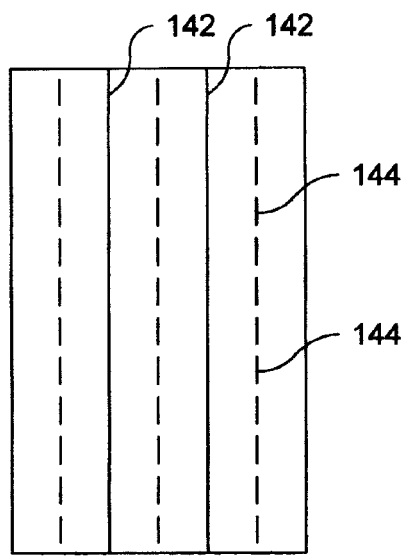
FIG. 14 is a schematic plan view of a fabric of an embodiment of this invention as stitched in which the substrate has a plurality of continuous and interrupted straight slits.
Figure 15:
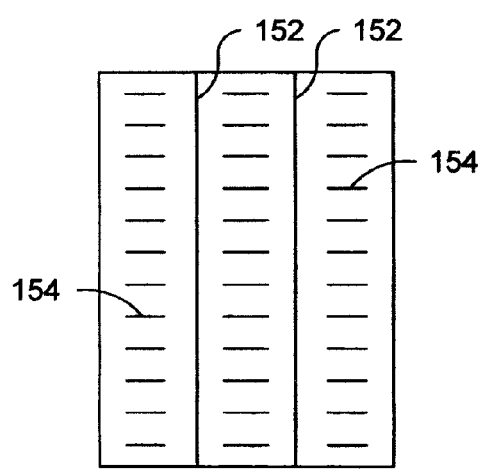
FIG. 15 is a schematic plan view of a fabric of another embodiment of this invention as stitched in which the substrate has a plurality of continuous and interrupted straight slits.

Yet further embodiments employing interrupted straight slits are shown in FIGS. 13A-13C (stitching points are not shown). FIG. 13A depicts a "herring bone" array of interrupted slits disposed in MD rows such that the orientation from row to row of the tangent lines has an alternating oblique angle with the XD direction. FIG. 13B shows the swatch of fabric 13A subjected to XD tension and FIG. 13C shows the same swatch subjected to MD tension. Still other embodiments include the combination of curvilinear slits with straight slits in the same fabric and the combination of continuous slits with interrupted slits in the same fabric. FIG. 14 is representative of a suitable substrate layer with an array of a plurality of continuous slits 142 and interrupted slits 144. The tangent lines of all the slits are oriented in the MD. In another exemplary substrate layer embodiment illustrated in FIG. 15, continuous slits 152 are aligned in the MD while a plurality of interrupted slits 154 are oriented in the XD.

Figure 16:
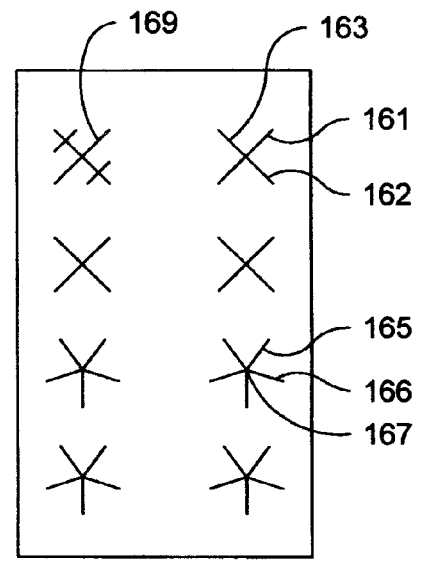
FIG. 16 is a schematic plan view of a substrate illustrating various interrupted intersecting slits according to embodiments of this invention.

In one particular embodiment, individual slits in the array of interrupted slits intersect with other individual slits. This structure can be understood with reference to FIG. 16 which shows a swatch of substrate for a stitchbonded fabric having generally star-shaped intersecting slits of various types. Cross type intersecting slits 161 include two slits 162 and 163. The two slits cross each other to form an "X" pattern. Intersecting slits 165 are a spoke type variation of the cross in which the legs of the star 166 meet at a common point 167. The number of legs in an intersecting slit can be other than those illustrated and from three to about eight per intersecting slit are preferred. Still further, the lengths of the legs from the common point of intersection of a star-shaped slit can be different. Yet further it is contemplated that multiple intersecting slits can intersect with each other. That is, there may be two or more common points as in the intersecting slit 169.

The area of the substrate layer having slits can be varied to achieve different effects. In one aspect, the whole area of the substrate can include slits. In another aspect, only selected portions of the area of the substrate are slitted.

In a further aspect the novel stitchbonded fabric can include supplemental substrate layers, i.e., more than a single substrate layer, provided that at least one substrate layer contains slits. Also in accord with the present invention, the substrate should have uniform physical properties over the whole area of the stitchbonded fabric. That is, except for the presence or absence of slits, the properties of the substrate are substantially the same at all locations on the area of the substrate, whether the substrate is constituted by a single layer of substrate material or multiple layers of substrate material. To assure uniformity of the whole substrate, each of the substrate layers individually and independently should have substantially uniform physical properties throughout. Exemplary physical properties that should be uniform over the extent of each layer include density (i.e., mass per unit volume), basis weight (i.e., mass per unit area), chemical composition, thickness, porosity, permeability, elongation, (i.e., stretch capability), elasticity, tensile strength, barrier properties, dyeability, abrasion resistance, texture and the like. Coloration is not deemed to be a significant physical property that should be uniform over the whole of substrate area, i.e., color of the substrate can vary from place to place on the area of the substrate. Calling for the substrate to be uniform further infers that the component substrate layers when more than one are present should all be congruently positioned adjacent to each other, i.e., stacked one on another such that the areas of the individual layers coincide.

A variety of substrate layer combinations may be utilized in the stitchbonded fabric of this invention. These include (a) a single slit-containing substrate layer, (b) a plurality of slit-containing substrate layers, (c) a single, slit-containing substrate layer and a single, substrate layer free of slits, i.e., containing no slits, (d) a single slit-containing substrate layer and a plurality of substrate layers free of slits, and (e) a plurality of slit-containing substrate layers and a plurality of substrate layers free of slits. When multiple layers are present, individual layers can have properties that are the same as or different from other layers in the fabric. All of the layers of the substrate in a fabric should be stitched through by the stitching threads. The stitching is uniform throughout the extent of the fabric.

In those fabrics of this invention which comprise multiple substrate layers containing slits, the array of slits in each of such layers can be the same or different from other layers. In one specific embodiment, the slit arrays of all the substrate layers comprising slits are identical. That is, the slits of each layer coincide with those of the other layers. In other embodiments, the slits of one layer can be different from those of other layers in such ways as (i) being fewer or greater in number per unit area, (ii) being of different size or shape, (iii) having different straight line or curvilinear configuration, (iv) not coinciding with slits of other layers, and combinations of these. In some preferred embodiments that include multiple substrate layers containing slits, the layers, slit configurations, stitching patterns and materials are selected such that when the lips of the slits are pulled apart, the substrate of one or more layers pucker out of the fabric plane while the substrate of one or more of other layers remain conformed substantially within the plane of the fabric.

Figure 17:
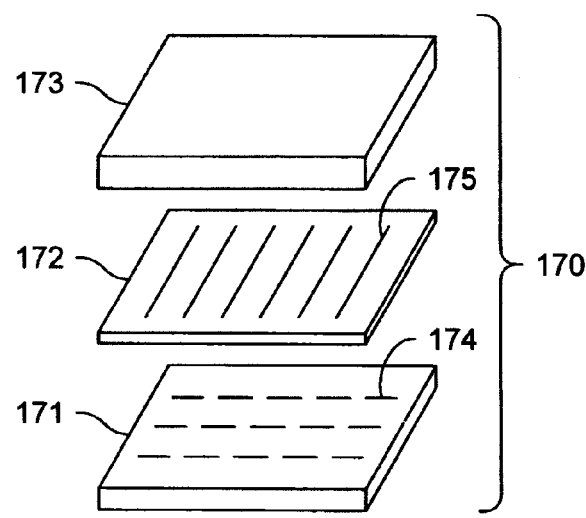
FIG. 17 is perspective exploded view of a multiple substrate layer component suitable for use in a stitchbonded fabric according to this invention.

A representative embodiment of a multiple substrate layer component for the novel stitchbonded fabric which exemplifies a number of the concepts disclosed above is shown in FIG. 17. The figure shows an exploded view of a rectangular swatch 170 of the substrate. The overall substrate has three tiers 171, 172, and 173. Each tier is individually uniform, except for the presence or absence of slits. The figure is drawn to show that uppermost tier 173 is a relatively thick substance, middle tier 172 is a comparatively thin substance and that the thickness of lower tier 171 is intermediate the thicknesses of tiers 172 and 173. Thus the tiers are different from each other yet the overall combination of substrate 170 has a uniform thickness throughout its extent. The figure further shows that tiers 171 and 172 contain arrays of interrupted straight slits and that tier 173 is free of slits. Furthermore, the slits 174 of tier 171 are different from slits 175 of tier 172 in length, number and orientation.

From the foregoing it is seen that the stitchbonded fabric according to this invention can have enhanced stretch capability as compared to wholly unitary substrate base layer stitchbond fabrics. A main factor that contributes to the improved stretch performance is the ability of the slits to open wide which allows the substrate material to expand laterally. Additionally, some of the stitching threads are stitched through the slits and therefore are free to move laterally within the bounds of the slit. Of course these stitches do have a finite limit on their ability to move laterally, however, they have greater capability to move laterally than had they been anchored at fixed positions by the body of substrate material. As mentioned, the extent to which unparted lips of linear slits open depends on the angle with which tension force is applied relative to the direction of the tangent line at any point on the slit. Most stretching occurs when the tension is perpendicular to the tangent line.

The existence of slits can impart a significantly large increase in the stretch of the whole fabric and can provide much enhancement to stretch in the XD. Cross machine direction stretch is typically limited in conventional uniform substrate stitchbonded fabrics. Utilizing a slit substrate layer according to this invention can provide incremental stretch of the fabric by at least 5% in at least one direction, preferably by at least 20% and more preferably by at least about 50%. The term "incremental stretch" means the difference between the length of a dimension of a fabric subjected to a tension force and the length of the same dimension with the fabric in a substantially relaxed state, i.e., prior to application of the tension force. To obtain considerably enhanced incremental stretch, preferably at least 50% of the slits should have tangent lines aligned perpendicular to the direction in which improved stretch is desired. Thus to achieve much improved XD stretch, it is desirable that at least about half of the slits should have tangent lines parallel to the MD.

Parting of the lips of the slits by applying tension usually also causes the stitching threads within the areas of the open slits to be exposed and visually perceptible by a viewer or user of the fabric. The exposed stitching threads can dramatically alter the visual appearance compared to that of a stitchbonded fabric of a non-slit substrate. The present invention thus easily provides the stitchbonded fabric with a unique and aesthetically pleasing appearance in addition to increasing stretch characteristics.

Appearance features of the stitchbonded fabric with slit substrates can be further enhanced by processing after stitchbonding is completed. In the as-stitched condition, slits in the substrate layer are unparted. Visual appearance can be modified initially by stretching the stitchbonded fabric from its as-stitched condition. Stretching is achieved by applying lateral tension in at least one direction within the plane defined by the unstretched fabric. As mentioned, the extent of slit-opening and exposure of stitching threads inside the opened slits among other factors largely depends upon the angle of tension relative to the tangent line of the slit. In a basic embodiment, after relieving tension, the stitchbonded fabric remains in its stretched state with opened slits and exposed stitching threads perceptible.

In another preferred embodiment, stitching threads and/or one or more substrate layers can include an elastic or contractible component. In this embodiment, after the fabric is stretched and tension relieved, further processing can cause the stretched fabric to laterally contract such that a significant portion of the incremental stretch is recovered. Contraction of the stitchbonded fabric after stretching can have several effects. For example the fabric can buckle out of plane. This can occur if the stitching threads or one or more of substrate layer is a non-contracting material. The non-contracting element, i.e., thread and/or substrate, attempts to retain its dimension attained after the stretching step while the contracting element draws the fabric to a smaller area. The non-contracting element not being able to shrink to smaller dimensions gathers, and buckles the fabric out of planar conformation.

Another potential effect of contraction is distortion of the opened slits, i.e., puckering similar to that caused by pulling apart the lips of slits. The contracting force tends to deform the substrate such that the opened slits distort. Thus the shapes of the opened slits change upon contraction. Also the exposed stitching threads within the opened slits become distorted and may entangle or bulk up. These phenomena dramatically change the appearance of the stitchbonded fabric.

Several methods of causing contraction of the stitchbonded fabric after stretching are contemplated. One method utilizes elastic components. A stitching thread and/or one or more substrate material can be elastic. The terms "elastic", "elasticity", "elastically" and the like herein refer to the property of a fiber, filament, yarn, film or fabric to stretch when under tension and then, when the tension is released, to recover usually rapidly to nearly its original length.

Conventional elastic yarns, such as bare or covered yarns of spandex or rubber, and textured stretch yarns of nylon or polyester or other synthetic polymers, are well suited for use in the fabrics of the invention. A preferred elastic stitching thread is a spandex elastomeric yarn that has high elongation (e.g., 300-800%) and high retractive power. As used herein, the term "spandex" has its conventional meaning, that is, a manufactured fiber in which the fiber-forming substance is a long chain synthetic polymer comprised of at least 85% of a segmented polyurethane. Such preferred yarns are available commercially (e.g., "Lycra" spandex yarn sold by Invista North America S.A.R.L., Wilmington, Del.).

The stitching thread can also comprise elastic combination yarn. The term "elastic combination yarn" refers to a yarn having a first component of elastic fiber combined with a second component of non-elastic (i.e., occasionally called "hard") fiber. The elastic-filament content of the combination yarn can be within a wide range. The elastic-filament content can amount to as much as 60% percent of the total weight of the combination yarn. More typically, the elastic fiber content is in the range of 2 to 20% of the total weight of the yarn and a content of 3 to 8% generally is preferred for reasons of cost. Usually, the combination yarn is a bulky yarn that is capable of a considerable elastic stretch and recovery. Typical elastic combination yarns for use in the present invention have a recoverable elongation in the range of 50% to 250%, or even higher. Preferably spandex fiber is the elastic component of elastic combination yarns for use in this invention. Known techniques can be used to combined the component fibers such as air-jet entangling, air-jet intermingling, covering, plying and the like.

The fabric can be made elastic by including a substrate having elastic properties. This can be achieved by deploying elastic yarns within a substrate layer of fibrous fabric or by incorporating in the substrate a film or membrane of elastic material such as an elastic rubber film.

Causing an element of the stitchbonded fabric to shrink is another technique that can be utilized to contract the fabric after stretching. Usually this involves incorporating a heat-shrinkable thread or substrate layer material in the fabric. Heat shrinkable materials for use in threads, fabrics and film are well known in the art. Such materials will contract significantly upon exposure to elevated temperature. Thus the novel stitchbonded fabric can be stretched under tension, relaxed and then subjected to heat treatment such that a heat-shrinkable component will contract. An example of a shrinkable material is a heat shrinkable film such as melt-extruded polyethylene or polypropylene that may or may not have slits of its own.

A preferred heat-shrinking component for use in this invention is a fiber of partially molecularly oriented polymer. As used herein, the term "fiber of partially molecularly oriented polymer" means fiber of synthetic organic crystalline polymer that has substantial molecular orientation, but which still can achieve further molecular orientation. Yarn of partially molecularly oriented fiber, sometimes referred to herein as "POY", is suited for use as stitching thread in the present invention and typically has break elongation in the range of 50 to 150%. The composition, preparation and use of POY in stitchbonded fabrics is now well known in the art as disclosed in my U.S. Pat. Nos. 6,407,018 and 5,707,710. A particular advantage of using POY is that a POY-containing stitchbonded fabric can be stretched, shrunk or both, and then heat-set by relaxing it under restraint at an elevated temperature. This "freezes" the dimensions of the fabric at a state most advantageous for a specific application.

The present invention further provides a novel process for making a stitchbonded fabric having unique and unexpectedly interesting aesthetic stretch and other functional qualities. In a basic aspect the process includes providing a substrate layer of a unitary substrate material that has uniform physical properties over its entire extent. The process further includes incorporating an array of slits into the substrate layer over at least a portion of the area of the fabric. The slits are defined by opposing lips. While maintaining the slits such that the lips are unparted, i.e., the opposing lips are very near to each other, the process includes stitching through the substrate layer with one or more threads in a pattern of stitches disposed over the whole area of the fabric.

The substrate material can be a fibrous web and more specifically can be a nonwoven, woven, knit, or composite fabric of nonbonded fibers. Representative of suitable substrate materials are batts of carded fibers, air-laid fiber batts, nonwoven sheets of continuous filaments, lightly consolidated or lightly bonded spunbonded sheets, sheets of hydraulically entangled fibers, and the like. Additionally, the substrate material can be or include a non-fibrous layer such as a polymeric film or a metallic foil.

The slits can be introduced into the substrate layer by various techniques. In one embodiment, the slits are preformed in the substrate layer. That is, the slits are created in a significant quantity of the substrate material in a slit-forming unit operation at a time before the stitchbonding occurs. Typically, all of the substrate material in the pre-formed substrate is slit before starting to stitch. The slit pre-formed substrate can be packaged and stored for later stitchbonding. For example, the substrate can be supplied in bulk as a web typically wound up on a roll. The web can be unwound and processed in a slitting operation then re-wound and stored in a slitted state. Later the slitted substrate web can be fed to a stitchbonding machine in a conventional stitching operation to create the fabric. Slits can be made in the web by well known slitting methods, such as piercing with wires, flames, laser beams, rotary saws, to name a few representative examples.

A preferred method for pre-forming a slitted substrate layer calls for continuously unrolling and feeding a uniform, unitary web of the substrate material to a roller die cutter. The web is compressed in the nip between a rotating drum and an opposing backup roll. The drum has multiple blades affixed pointing outwardly from its cylindrical surface toward the backup roll. The blades make slits in the web which is rewound for later stitchbonding.

Other preferred methods call for introducing the slits in the web contemporaneously, i.e., in situ, with the stitchbonding step. In such methods, the substrate material is continuously fed to an automated stitchbonding machine. The stitch-bonding can be performed with conventional multi-needle stitching equipment, such as "Arachne", "Liba" or "Mali" (including Malimo, Malipol and Maliwatt machines). Such machines and some fabrics produced therewith are disclosed by K. W. Bahlo, "New Fabrics Without Weaving", Paper of the American Association for Textile Technology, Inc., pages 51-54 (November, 1965), by Ploch et al, U.S. Pat. No. 3,769,815, by Hughes, U.S. Pat. No. 3,649,428 and in Product Licensing Index, Research Disclosure, "Stitchbonded products of continuous filament nonwoven webs", page 30 (June 1968).

Such machines vary in construction and features by machine manufacturer preference and by machine user options selection. However, these machines typically have a wide body spanning the cross machine direction of the fabric and one or more vertically reciprocating needle-holding bars within the body. The substrate is usually supplied in wound-up bolts that are unwound using a system of rollers and optional tenter accessories to feed the substrate into the machine at controlled rate and tension. In a certain aspect, the novel process calls for slitting the substrate after it is unwound and before it enters the body of the machine. In another aspect, the slits are formed inside the machine and may be produced by action of knives on the bars or by specially designed needles themselves.

When slitting the substrate in situ upstream of the stitching machine, the slits can be formed in a variety of ways. For example, a roller die cutter with a rotating knife bearing drum as described above may be used. As the substrate is fed to the stitchbonding machine, it is pressed against the surface of the drum at which time the knives pierce the substrate to create slits at pre-selected positions and lengths. Another technique calls for mounting a series of knives on one or more bars or frames above or below the substrate moving into the stitchbonding machine. At designated times the knives are moved toward the and then away from the substrate to create the slits of desired length and position. In yet another technique preferred for making continuous slits, the knives are mounted in fixed positions vertically penetrating the substrate as it feeds into the machine. It is recommended to feed the substrate with very little tension as it enters the stitching machine after the slitting knives penetrate the substrate. If the feed tension is too high, it can cause the lips to part and the slits to open prior to insertion of the stitching yarns. According to this invention the stitching threads are inserted while the slits are substantially closed with the opposing lips close to each other.

A preferred method of in situ slit formation calls for feeding the substrate unslitted into the stitchbonding machine and using knives on or affixed to the needle bars to create the slits at or nearly simultaneously with stitch insertion. The knives can be mounted on arms attached to the needle bars such that the knife blades are offset laterally from the needles by pre-selected distances in the MD and XD. The knives are oriented vertically and the knife blades are elevated at proper height to pierce the substrate as the needle bars reciprocate to insert stitches. A knife can be associated with each or some of the needle positions. This method is ideal for assuring precision placement of the slits relative to the stitching points.

Figures 18A, 18B, 18C:
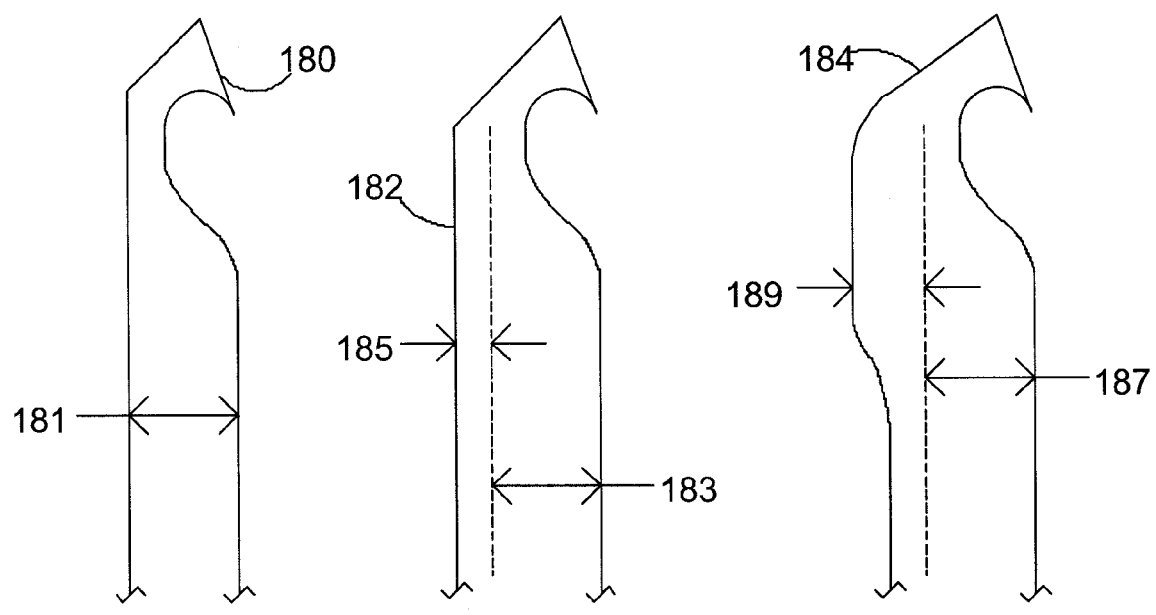
FIG. 18A is a side elevation view of a portion of a conventional stitchbonding machine needle.
FIG. 18B is a side elevation view of a portion of a stitchbonding machine needle suitable for creating in situ narrow interrupted straight slits during stitchbonding in accord with an embodiment of this invention.
FIG. 18C is a side elevation view of a portion of a stitchbonding machine needle suitable for creating in situ wide interrupted straight slits during stitchbonding in accord with another embodiment of this invention.

In another preferred embodiment of this invention, slits are formed by knife blades on the stitchbonding needles as can be understood with reference to FIGS. 18A-18C. FIG. 18A shows the profile of an end of a conventional stitching machine needle. The needle 180 has a substantially uniform width shank below the hook by which the needle is held in the needle bar. The shank has a characteristic width dimension 181. By comparison, FIG. 18B illustrates the profile of a novel needle 182 that can cut slits as it stitches the substrate. The shank has width dimension greater than that of needle 180. The total width is the sum of width portions 183 and 185. Width portion 183 is the same as the conventional needle, i.e., width 181. Width portion 185 is an extension of the needle width such that the total width is effective to cut into the substrate adjacent to the associated stitch insertion point. This figure shows the extension dimension 185 as being relatively small compared to the conventional needle width 181, and preferably about 0.1-0.5 times. A small extended needle width thus provides a series of short interrupted slits in the substrate. FIG. 18C illustrates another representative embodiment of an extended width needle suitable for cutting longer interrupted slits or continuous slits. In this figure, 187 represents the conventional needle width, i.e., same as 181, and 183, and distance 189 is the blade extension of the needle at the widest point. Needle extension 189 can be greater than about 0.5 times conventional needle width 181 and can be as large as desired provided that the needle does not interfere with other physical mechanisms of the stitching system. In accord with this invention, extended width, slit-cutting needles may be deployed in any one or more needle positions on the needle-holding bars. In a further aspect, knife blades not part of the needles can be deployed on the needle bar to slit the substrate. In addition to cutting slits in the MD, this technique provides the ability to cut slits oriented in XD and angles intermediate the XD and MD.

After stitchbonding the fabric emerges from the downstream side of the machine body and can be wound up using another system of rollers. Optionally, the process includes a post-stitching treatment such as tensioning the fabric to pull apart the lips of slits and to impart puckering of the lips. After pulling open the slits, further optional treatment can include contracting to buckle the fabric. Depending on whether suitable material such as POY is incorporated, the fabric can be heat set at any extent of stretch or contraction. The post-stitchbonding treatments can be performed by later unwinding the stitchbonded product at a later time. Alternatively, the post-stitchbonding treatment can be carried out in situ as the stitchbonded fabric leaves the stitching machine and before being wound up.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A stitchbonded fabric comprising (A) a substrate layer of a unitary substrate material having uniform physical properties and an area comprising a slit array of one or more unparted slits, and (B) a plurality of stitching threads over-stitching the area through the substrate layer such that the stitching threads penetrate the substrate material and some stitching threads insert within the unparted slits.

2. The stitchbonded fabric of claim 1 which has a peripheral boundary defining fabric edges and in which the slit array comprises a continuous slit extending fully from one of said fabric edges to another fabric edge opposite the first fabric edge.

3. The stitchbonded fabric of claim 2 in which the slit array comprises a straight continuous slit.

4. The stitchbonded fabric of claim 3 in which the slit array has a plurality of straight continuous slits and in which all of said slits are mutually parallel.

5. The stitchbonded fabric of claim 3 in which the slit array has a plurality of straight continuous slits and in which one or more of said slits is not parallel with another of said slits.

6. The stitchbonded fabric of claim 3 in which the slit array further comprises a continuous slit that is curvilinear.

7. The stitchbonded fabric of claim 2 in which the slit array comprises a curvilinear continuous slit.

8. The stitchbonded fabric of claim 7 in which the slit array has a plurality of curvilinear continuous slits each of which slits defines an axis and in which the axes of all of said slits are mutually parallel.

9. The stitchbonded fabric of claim 8 in which the slit array has a plurality of curvilinear continuous slits each of which slits comprises curved segments and in which the curvature of all of said curved segments are mutually in phase.

10. The stitchbonded fabric of claim 1 which has a peripheral boundary defining fabric edges and which the slit array comprises a plurality of interrupted slits each of which do not extend fully from one of said fabric edges to an other fabric edge opposite the first fabric edge.

11. The stitchbonded fabric of claim 10 in which the slit array comprises interrupted slits which are straight.

12. The stitchbonded fabric of claim 11 in which the slit array further comprises a continuous slit which extends fully from one fabric edge to the other fabric edge.

13. The stitchbonded fabric of claim 11 in which the slit array further comprises interrupted slits which are curvilinear.

14. The stitchbonded fabric of claim 10 in which the interrupted slits are curvilinear.

15. The stitchbonded fabric of claim 14 in which the slit array further comprises a continuous slit which extends fully from one fabric edge to the other fabric edge.

16. The stitchbonded fabric of claim 1 in which the substrate material is a web selected from the group consisting of woven fibrous fabrics, nonwoven fibrous fabrics, knit fabrics, stitchbonded fabrics, polymeric films and metal foils or a combination thereof.

17. The stitchbonded fabric of claim 1 in which the slit array is disposed over all of the substrate.

18. The stitchbonded fabric of claim 1 in which the slit array is disposed over less than all of the substrate.

19. The stitchbonded fabric of claim 1 which further comprises a supplemental substrate layer of unitary substrate material having uniform physical properties which supplemental substrate layer is disposed coextensively with the substrate layer, is free of slits and is stitched by the pattern of threads.

20. The stitchbonded fabric of claim 1 which comprises a plurality of substrate layers of unitary substrate material disposed coextensively with each other, each independently having uniform physical properties in which more than one of the substrate layers comprise a slit array of one or more unparted slits and in which the threads are stitched through all of the substrate layers.

21. The stitchbonded fabric of claim 20 in which the slit array of at least one substrate layer is different from the slit array of another substrate layer.

22. The stitchbonded fabric of claim 20 in which all of the substrate layers comprise identical slit arrays.

23. The stitchbonded fabric of claim 1 in which the unparted slits have opposing lips and define tangent lines to the lips and which fabric comprises stretchable stitching threads and pattern of stitches such that the stitchbonded fabric can extend incrementally at least about 5% in at least one direction perpendicular to a tangent line.

24. The stitchbonded fabric of claim 23 in which the pattern of stitches is defined by a machine direction and a cross machine direction perpendicular to the machine direction, in which greater than 50% of the slits have tangent lines parallel to the machine direction and in which the stitchbonded fabric has greater than 5% more stretch in the cross machine direction than the stitchbonded fabric of same threads, stitching pattern and substrate material free of slits.

25. A stitchbonded fabric made by a process comprising the following steps:
    (A) providing a substrate layer of a unitary substrate material having uniform physical properties,
    (B) introducing into an area of the substrate layer a slit array of one or more unparted slits which have opposing lips, and
    (C) while maintaining the slits in an unparted state, continuously in a multi-needled, stitchbonding machine comprising needle bars, stitching through the substrate layer with threads in a pattern of stitches such that the stitching threads penetrate the substrate material and some stitching threads insert within the unparted slits thereby providing an unparted-slit stitchbonded fabric.

26. The stitchbonded fabric of claim 25 in which the slits are introduced into the substrate layer in a pre-forming step discontinuous from the stitching step.

27. The stitchbonded fabric of claim 25 in which the slits are introduced into the substrate layer in situ with the stitching step.

28. The stitchbonded fabric of claim 27 in which the substrate layer is slit by stationary knives positioned upstream of the stitchbonding machine.

29. The stitchbonded fabric of claim 27 which further comprises the steps of feeding the substrate layer to the stitchbonding machine at a preselected speed, providing a drum with a cylindrical surface and an array of cutting blades protruding outwardly from the surface, and rotating the drum such that the linear velocity of the cutting blades substantially matches the speed, and contacting the substrate layer with the cutting blades.

30. The stitchbonded fabric of claim 27 in which the substrate layer is slit by reciprocating knives mounted on the needle bars.

31. The stitchbonded fabric of claim 30 in which the stitchbonding machine comprises at least one needle having an integral knife edge and in which the substrate layer is slit by the knife edge of the needle substantially simultaneously with stitching action of the stitchbonding machine.

32. The stitchbonded fabric of claim 31 in which all of the needles have integral knife edges.

33. The stitchbonded fabric of claim 25 in which the process further comprises the step of tensioning the unparted-slit stitchbonded fabric and thereby stretching the fabric by at least 5% in at least one direction.

34. The stitchbonded fabric of claim 33 in which the lips define tangent lines and the direction of stretch is perpendicular to at least one tangent line.

35. The stitchbonded fabric of claim 34 in which the process further comprises the step of stretching the unparted-slit stitchbonded fabric by an extent effective to open at least one slit such that the lips separate from each other and expose the threads between the opened lips.

36. The stitchbonded fabric of claim 33 in which the process further comprises after tensioning of the stretched fabric the step of recovering more than 50% of the at least 5% stretch in one direction.

37. The stitchbonded fabric of claim 36 in which the threads comprise an elastic component.

38. The stitchbonded fabric of claim 36 in which the stitchbonded fabric comprises a heat-shrinkable component.

39. The stitchbonded fabric of claim 38 in which the threads comprise a partially oriented yarn.

40. The stitchbonded fabric of claim 36 in which the process further comprises buckling the substrate layer out of plane.

41. The stitchbonded fabric of claim 36 in which the process further comprises prior to the stitching step, providing a plurality of substrate layers positioned coextensively with each other.

42. The stitchbonded fabric of claim 41 in which the process further comprises buckling out of plane at least one substrate layer.

43. The stitchbonded fabric of claim 41 in which one or more substrate layer is free of slits.

44. The stitchbonded fabric of claim 43 in which the process further comprises buckling out of plane at least one of the one or more substrate layer which is free of slits.

45. The stitchbonded fabric of claim 33 in which the process further comprises after tensioning of the stretched fabric the step of relieving tension from the stretched fabric and recovering less than 5% of the at least 5% stretch in one direction.

46. The stitchbonded fabric of claim 45 in which the process further comprises heat-setting the stitchbonded fabric and thereby permanently fixing the stitchbonded fabric in a stretched extension.

47. A process for making a stitchbonded fabric comprising the steps of
    (A) providing a substrate layer of a unitary substrate material having uniform physical properties,
    (B) introducing into an area of the substrate layer a slit array of one or more unparted slits which have opposing lips, and
    (C) while maintaining the slits in an unparted state, continuously in a multi-needled-stitchbonding machine, stitching through the substrate layer with threads in a pattern of stitches such that stitching threads penetrate the substrate material and some stitching threads insert within the unparted slits thereby providing an unparted-slit stitchbonded fabric.

48. The process of claim 47 in which the stitchbonding machine comprises needle bars and which process comprises slitting the substrate layer by reciprocating knives mounted on the needle bars in situ with the stitching step.

49. The process of claim 47 in which the stitchbonded fabric has a peripheral boundary defining fabric edges and which process comprises forming at least one continuous slit which extends fully from one of said fabric edges to another fabric edge opposite the first fabric edge.

50. The process of claim 47 which further comprises the step of tensioning the unparted-slit stitchbonded fabric and thereby stretching the fabric by at least 5% in at least one direction to a stretched extension.

51. The process of claim 50 which further comprises stretching open at least one slit such that the lips of said slit separate from each other and expose the threads between the lips.

52. The process of claim 51 which further comprises recovering more than 50% of the stretched extension.

53. The process of claim 52 which further comprises heat setting the stitchbonded fabric after recovering said stretched extension.

54. The process of claim 51 which further comprises heat setting the stitchbonded fabric in the stretched extension.

55. The process of claim 47 in which the stitchbonding machine comprises a plurality of needles mounted on needle bars, one or more of said needles having a shank width extended at least about 0.1 times that of a conventional needle width and which process comprises slitting the substrate layer by the needles that have extended shank width in situ with the stitching action of the needles.

56. An article comprising the fabric of claim 1, said article selected from the group consisting of a mattress cover skirt and a cleaning wipe.

* * * * *